(12) United States Patent
Zhang et al.

(10) Patent No.: US 10,727,893 B2
(45) Date of Patent: Jul. 28, 2020

(54) RECONFIGURABLE FRONT-END MODULE FOR CARRIER AGGREGATION

(71) Applicant: SKYWORKS SOLUTIONS, INC., Woburn, MA (US)

(72) Inventors: Yaxing Zhang, Fremont, CA (US); Shaun Bryce Chamberlain, Stokesdale, NC (US); Srivatsan Jayaraman, Santa Clara, CA (US); Ethan Chang, Aliso Viejo, CA (US); Roman Zbigniew Arkiszewski, Oak Ridge, NC (US); Reza Kasnavi, Solana Beach, CA (US); John C. Baldwin, Greensboro, NC (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 15/953,759

(22) Filed: Apr. 16, 2018

(65) Prior Publication Data

US 2019/0028136 A1 Jan. 24, 2019

Related U.S. Application Data

(60) Provisional application No. 62/485,997, filed on Apr. 16, 2017.

(51) Int. Cl.
| | | |
|---|---|---|
| *H04B 7/02* | (2018.01) | |
| *H04B 1/44* | (2006.01) | |
| *H01Q 21/30* | (2006.01) | |
| *H01Q 5/30* | (2015.01) | |
| *H01Q 5/50* | (2015.01) | |
| *H04B 1/00* | (2006.01) | |

(52) U.S. Cl.
CPC ............... *H04B 1/44* (2013.01); *H01Q 5/30* (2015.01); *H01Q 5/50* (2015.01); *H01Q 21/30* (2013.01); *H04B 1/006* (2013.01); *H04B 1/0057* (2013.01); *H04B 1/0064* (2013.01)

(58) Field of Classification Search
CPC ...... H04B 1/44; H04B 1/0057; H04B 1/0064; H04B 7/02; H04B 7/024; H04B 1/006; H04B 1/0078; H01Q 5/50; H01Q 21/30; H01Q 5/30
See application file for complete search history.

(56) References Cited

U.S. PATENT DOCUMENTS 9,172,441 B2 * 10/2015 Granger-Jones ..... H04B 7/0404
9,515,695 B2 * 12/2016 Bagger ................. H04B 1/525
(Continued)

*Primary Examiner* — Andrew Wendell
(74) *Attorney, Agent, or Firm* — Chang & Hale LLP

(57) ABSTRACT

Reconfigurable front-end module for carrier aggregation. In some embodiments, a front-end module can include a plurality of signal ports and a plurality of antenna ports. The front-end module can further include a switch assembly configured to route signals along one or more of a plurality of filtering paths between the signal ports and the antenna ports. Each of the filtering paths can include a filter, and the filtering paths can be configured to allow the antenna ports to be combined outside of the front-end module to accommodate a corresponding antenna configuration. The filtering paths can be further configured to maintain desirable filtering performance levels for different combinations of the antenna ports outside of the front-end module corresponding to the different antenna configurations.

16 Claims, 8 Drawing Sheets

(56) References Cited

U.S. PATENT DOCUMENTS

| | | | | |
|---|---|---|---|---|
| 2004/0239442 | A1* | 12/2004 | Wilcox | H04B 1/005 |
| | | | | 333/126 |
| 2005/0032484 | A1* | 2/2005 | Itakura | H01P 1/15 |
| | | | | 455/114.1 |
| 2013/0154868 | A1* | 6/2013 | Kehrer | H04B 1/109 |
| | | | | 342/16 |
| 2014/0112213 | A1* | 4/2014 | Norholm | H04B 1/56 |
| | | | | 370/277 |
| 2014/0194072 | A1* | 7/2014 | Mach | H04B 1/0458 |
| | | | | 455/73 |
| 2016/0112072 | A1* | 4/2016 | Bauder | H04B 1/0057 |
| | | | | 370/297 |
| 2016/0119003 | A1* | 4/2016 | Granger-Jones | H04B 1/006 |
| | | | | 370/276 |
| 2018/0013460 | A1* | 1/2018 | Wilhelm | H04B 1/18 |
| 2018/0331714 | A1* | 11/2018 | See | H04B 1/44 |

* cited by examiner

RECONFIGURABLE FRONT-END MODULE FOR CARRIER AGGREGATION

CROSS-REFERENCE TO RELATED APPLICATION(S)

This application claims priority to U.S. Provisional Application No. 62/485,997 filed Apr. 16, 2017, entitled RECONFIGURABLE FRONT-END MODULE WITH INTEGRATED FILTERS FOR CARRIER AGGREGATION, the disclosure of which is hereby expressly incorporated by reference herein in its respective entirety.

BACKGROUND

Field

The present disclosure relates to front-end systems, devices, circuits and/or methods for wireless applications.

Description of the Related Art

In wireless applications, a front-end provides an interface between a radio-frequency circuit and one or more antennas. Such a radio-frequency circuit can provide either or both of transmit and receive functionalities.

SUMMARY

In some teachings, the present disclosure relates to a front-end module having a plurality of signal ports and a plurality of antenna ports. The front-end module further includes a switch assembly configured to route signals along one or more of a plurality of filtering paths between the signal ports and the antenna ports. Each of the filtering paths includes a filter, and the filtering paths are configured to allow the antenna ports to be combined outside of the front-end module to accommodate a corresponding antenna configuration. The filtering paths are further configured to maintain desirable filtering performance levels for different combinations of the antenna ports outside of the front-end module corresponding to the different antenna configurations.

In some embodiments, the antenna ports can include a low-band antenna port, a mid-band antenna port, and a high-band antenna port. The filtering path corresponding to the low-band antenna port can include a low-band filter, the filtering path corresponding to the mid-band antenna port can include a mid-band filter, and the filtering path corresponding to the high-band antenna port can include a high-band filter.

In some embodiments, the low-band filter, the mid-band filter, and the high-band filter can be configured to support an antenna configuration having a single antenna, with corresponding desirable filtering performance levels. In some embodiments, the low-band filter, the mid-band filter, and the high-band filter can be configured to support an antenna configuration having two antennas, with corresponding desirable filtering performance levels. For example, the low-band filter and the mid-band filter can be configured to support the first of the two antennas, and the high-band filter can be configured to support the second of the two antennas. In another example, the low-band filter can be configured to support the first of the two antennas, and the mid-band filter and the high-band filter can be configured to support the second of the two antennas.

In some embodiments, the desirable filtering performance levels can include performance levels associated with non-carrier aggregation operations. In some embodiments, the desirable filtering performance levels include performance levels associated with carrier aggregation operations. In some embodiments, the desirable filtering performance levels can include one or more performance levels associated with insertion loss, out-of-band rejection, and impedance.

According to some implementations, the present disclosure relates to a packaged module having a packaging substrate configured to receive a plurality of components, and a front-end circuit implemented on the packaging substrate. The front-end circuit includes a plurality of signal ports and a plurality of antenna ports, and a switch assembly configured to route signals along one or more of a plurality of filtering paths between the signal ports and the antenna ports. Each of the filtering paths includes a filter, and the filtering paths are configured to allow the antenna ports to be combined outside of the front-end module to accommodate a corresponding antenna configuration. The filtering paths are further configured to maintain desirable filtering performance levels for different combinations of the antenna ports outside of the front-end module corresponding to the different antenna configurations.

In some embodiments, the packaged module can be a front-end module or an antenna switch module.

In accordance with some teachings, the present disclosure relates to a wireless device that includes a transceiver configured to process signals, and one or more antennas, with each being in communication with the transceiver. The wireless device further includes a front-end module implemented between the transceiver and the one or more antennas. The front-end module includes a plurality of signal ports and a plurality of antenna ports, and a switch assembly configured to route signals along one or more of a plurality of filtering paths between the signal ports and the antenna ports. Each of the filtering paths includes a filter, and the filtering paths are configured to allow the antenna ports to be combined outside of the front-end module to accommodate a corresponding antenna configuration of the one or more antennas. The filtering paths are further configured to maintain desirable filtering performance levels for different combinations of the antenna ports outside of the front-end module corresponding to the different antenna configurations.

In some embodiments, the antenna ports can include a low-band antenna port, a mid-band antenna port, and a high-band antenna port. The filtering path corresponding to the low-band antenna port can include a low-band filter, the filtering path corresponding to the mid-band antenna port can include a mid-band filter, and the filtering path corresponding to the high-band antenna port can include a high-band filter.

In some embodiments, the low-band filter, the mid-band filter, and the high-band filter can be configured to support an antenna configuration having a single antenna, with corresponding desirable filtering performance levels. In some embodiments, the low-band filter, the mid-band filter, and the high-band filter can be configured to support an antenna configuration having two antennas, with corresponding desirable filtering performance levels. For example, the low-band filter and the mid-band filter can be configured to support the first of the two antennas, and the high-band filter can be configured to support the second of the two antennas. In another example, the low-band filter can be configured to support the first of the two antennas, and the mid-band filter and the high-band filter can be configured to support the second of the two antennas.

In some embodiments, the wireless device can be a cellular phone configured for operation in a selected one of a plurality of different regions, such that the front-end module is capable of supporting operations of the wireless device in at least some of the different regions with the different antenna configurations. The desirable filtering performance levels can include performance levels associated with non-carrier aggregation operations. The desirable filtering performance levels can include performance levels associated with carrier aggregation operations.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
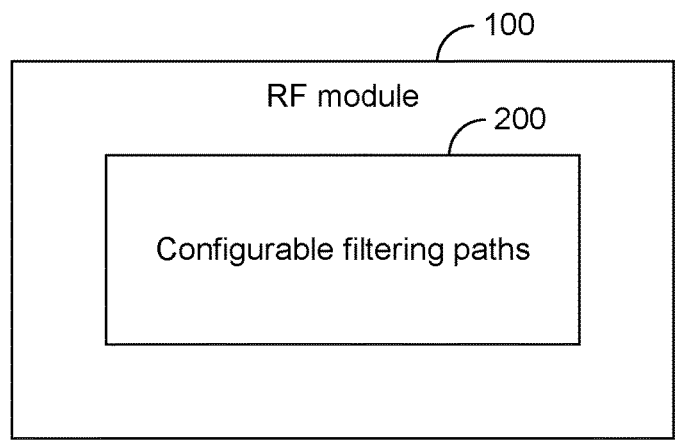
FIG. 1 depicts a radio-frequency (RF) module having configurable filtering paths.

FIG. 1 depicts a radio-frequency (RF) module 100 that includes an assembly 200 of configurable filtering paths. In some embodiments, such an assembly of configurable filtering paths can provide one or more desirable features as described herein.

Figure 2:
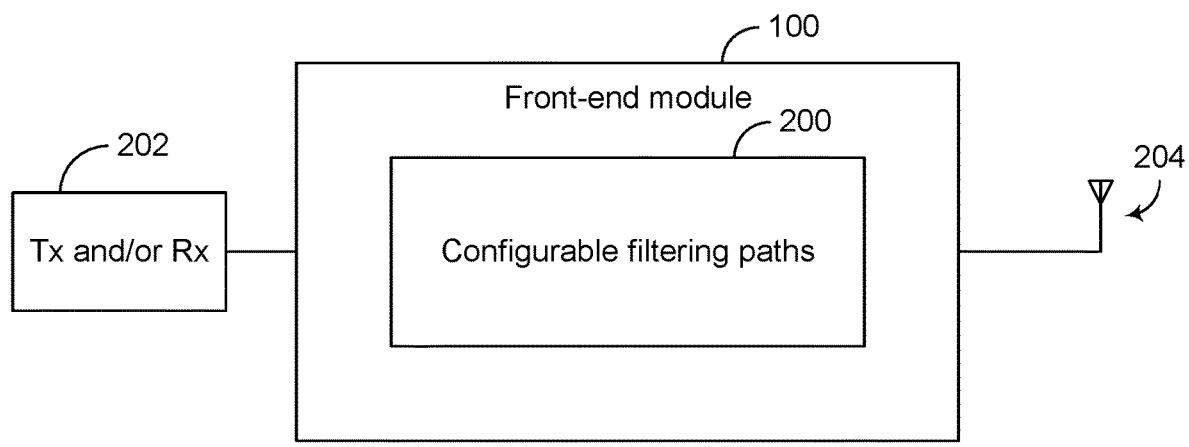
FIG. 2 shows that in some embodiments, the RF module of FIG. 1 can be implemented as a front-end module (FEM).

FIG. 2 shows that in some embodiments, the RF module 100 of FIG. 1 can be implemented as a front-end module 100. Such a front-end module can be implemented between a radio circuit 202 configured to provide transmit and/or receive functionalities, and one or more antennas 204. It will be understood that one or more features of the RF module 100 of FIG. 1 can also be implemented as other types of modules in RF applications.

Antenna configurations in many wireless devices such as smart-phones are typically driven by differences in frequency spectrum allocations between various geographic regions such as various countries. Such differences can enlarge with the implementation of carrier aggregation (CA) in cellular standards such as Long-Term Evolution (LTE) standard.

For example, a phone designed for a first region may need to support CA operation(s) involving a low-band (LB) and a mid-band (MB), while a phone designed for a second region may need to support CA operation(s) involving a MB and a high-band (HB). To support a plurality of regions with practical considerations such as cost, phone manufacturers tend to adopt multiple front-end-module (FEM) products on respective phone boards for different antenna configurations and filtering functionalities. In the foregoing examples, the first region can be or include, for example, China, and the second region can be or include, for example, India. It will be understood that the first and second regions, as well as any other regions described herein, can be or include other countries, groups of countries, geographic regions within a given country, geographic regions including a plurality of countries, etc.

Accordingly, configurations that allow implementation of as few FEM products as possible are highly desirable to, for example, save costs and still maintain desired performance levels at the same time. Disclosed herein are examples related to a front-end architecture that allows wireless devices such as cellular phones to be implemented so that a number of different antenna configurations can be supported with single FEM product while maintaining a desired level of performance (e.g., similar level of performance when compared with the multi-FEM-product solutions).

For a given wireless device product such as a cellular phone, a given conventional FEM product is configured differently to accommodate different configurations of the cellular phone for use in different respective regions. Accordingly, a given configuration of such a conventional FEM product typically has a limited amount of functionalities specifically configured for the corresponding specific region.

Figure 3:
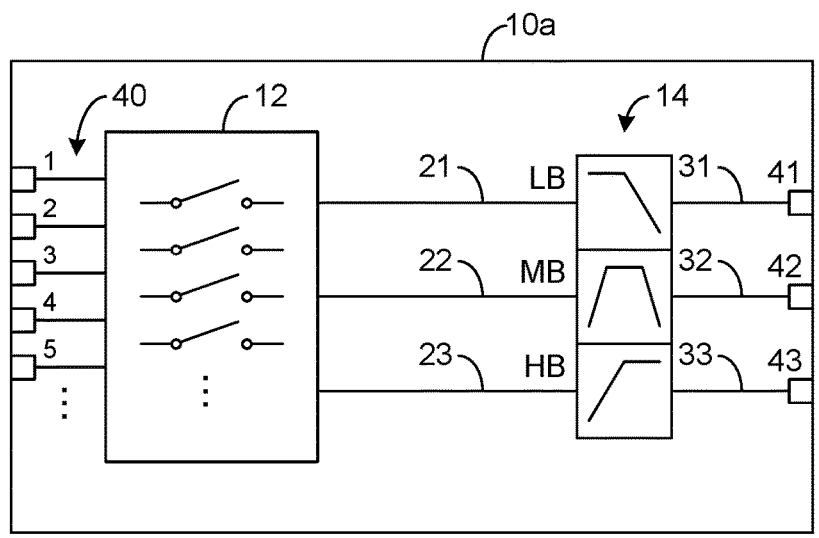
FIG. 3 shows an example FEM product configured to provide three antenna ports and a plurality of signal ports to allow routing of transmit (Tx) and/or receive (Rx) signals to and/or from the antenna ports.

For example, FIG. 3 shows a first example FEM product 10a configured to provide three antenna ports 41, 42, 43. Such a FEM product is shown to also include a plurality of signal ports 40 configured to facilitate routing of transmit (Tx) and/or receive (Rx) signals to and/or from the antenna ports (41, 42, 43). Some or all of such signal ports can be coupled with an assembly 12 of switches to allow, for example, a carrier aggregation operation involving a plurality of bands, a non-carrier aggregation operation involving a selected band, etc.

In the example of FIG. 3, an assembly 14 of filters is shown to include a low-band filter (LB), a mid-band filter (MB), and a high-band filter (HB). The low-band filter LB is shown to be coupled to the switch assembly 12 through a first signal path 21, and also coupled to the first antenna port 41 through a first signal path 31. The mid-band filter MB is shown to be coupled to the switch assembly 12 through a second signal path 22, and also coupled to the second antenna port 42 through a second signal path 32. The high-band filter HB is shown to be coupled to the switch assembly 12 through a third signal path 23, and also coupled to the third antenna port 43 through a third signal path 33.

Figure 4:
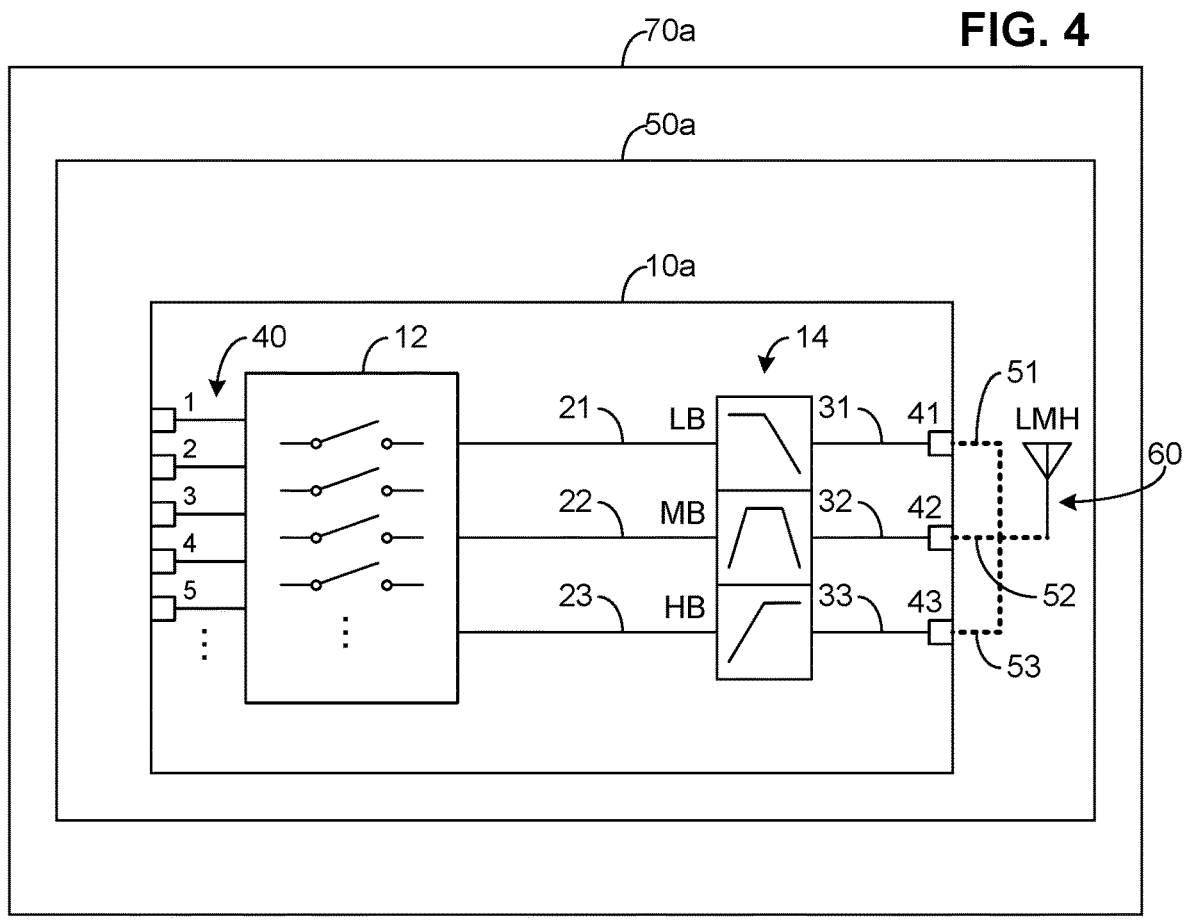
FIG. 4 shows an example of a configuration of a wireless device having the FEM product of FIG. 3.

FIG. 4 shows an example of a first configuration 70*a* of a wireless device (such as a cellular phone) having the first FEM product 10*a* of FIG. 3. The wireless device with the first configuration 70*a* is shown to include a first phone board configuration 50*a* that includes a signal routing circuit configured to couple the three antenna ports (41, 42, 43) of the first FEM product 10*a* to a single antenna 60 (e.g., an antenna capable of low, mid and high band (LMH) operations). More particularly, three signal paths 51, 52, 53 are shown to couple the respective antenna ports (41, 42, 43) of the first FEM product 10*a* to the single antenna 60, to accommodate various operations involving the low-band, mid-band, and/or high-band with the single antenna 60.

In the example of FIG. 4, the antenna 60 may be implemented on the phone board 50*a*, off of the phone board 50*a* (but within the phone 70*a*), or some combination thereof. It is also noted that in the example of FIG. 4, the signal routing configuration on the first FEM product 10*a* is implemented to accommodate the example signal routing configuration on the phone board 50*a*. More particularly, the signal paths 31, 32, 33 as well as the three antenna ports 41, 42, 43 are implemented to couple the low-band filter (LB), mid-band filter (MB), high-band filter (HB) to their respective off-FEM signal paths 51, 52, 53 on the phone board 50*a*.

Figure 5:
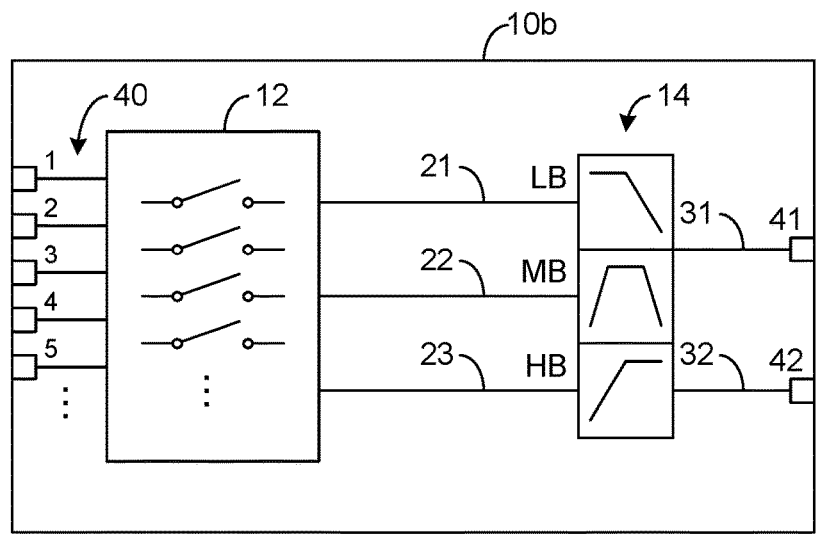
FIG. 5 shows an example FEM product configured to provide two antenna ports and a plurality of signal ports to allow routing of transmit and/or receive signals to and/or from the antenna ports.

In another example, FIG. 5 shows a second example FEM product 10*b* configured to provide two antenna ports 41, 42. Such a FEM product is shown to also include a plurality of signal ports 40 configured to facilitate routing of transmit (Tx) and/or receive (Rx) signals to and/or from the antenna ports (41, 42). Some or all of such signal ports can be coupled with an assembly 12 of switches to allow, for example, a carrier aggregation operation involving a plurality of bands, a non-carrier aggregation operation involving a selected band, etc.

In the example of FIG. 5, an assembly 14 of filters is shown to include a low-band filter (LB), a mid-band filter (MB), and a high-band filter (HB). The low-band filter LB is shown to be coupled to the switch assembly 12 through a first signal path 21, and also coupled to the first antenna port 41 through a first signal path 31. The mid-band filter MB is shown to be coupled to the switch assembly 12 through a second signal path 22, and also coupled to the first antenna port 41 through the first signal path 31. The high-band filter HB is shown to be coupled to the switch assembly 12 through a third signal path 23, and also coupled to the second antenna port 42 through a second signal path 32.

Figure 6:
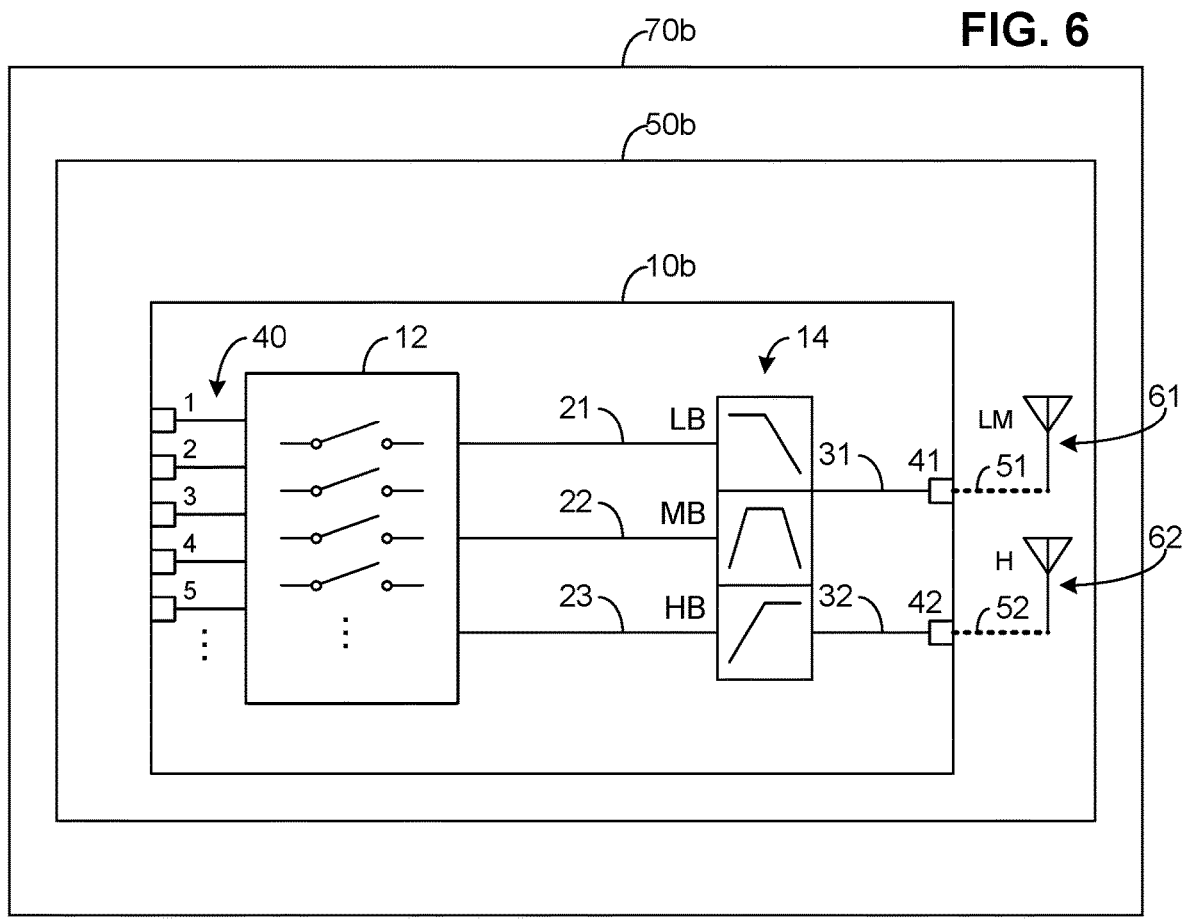
FIG. 6 shows an example of a configuration of a wireless device having the FEM product of FIG. 5.

FIG. 6 shows an example of a second configuration 70*b* of a wireless device (such as a cellular phone) having the second FEM product 10*b* of FIG. 5. For the purpose of description, such a second configuration (70*b*) can be implemented as an alternate configuration of the generally same wireless device of FIG. 4.

In the example of FIG. 6, the wireless device with the second configuration 70*b* is shown to include a second phone board configuration 50*b* that includes a signal routing circuit configured to couple the two antenna ports (41, 42) of the second FEM product 10*b* to two antennas 61, 62. The first antenna 61 can be configured for low and mid band (LM) operations, and the second antenna 62 can be configured for high band operations (H). More particularly, two signal paths 51, 52 are shown to couple the respective antenna ports (41, 42) of the second FEM product 10*b* to the respective antennas 61, 62, to accommodate various operations involving the low/mid-band antenna 61 and/or the high-band antenna 62.

In the example of FIG. 6, each of the two antennas 61, 62 may be implemented on the phone board 50*b*, off of the phone board 50*b* (but within the phone 70*b*), or some combination thereof. It is also noted that in the example of FIG. 6, the signal routing configuration on the second FEM product 10*b* is implemented to accommodate the example signal routing configuration on the phone board 50*b*. More particularly, the signal paths 31, 32 as well as the two antenna ports 41, 42 are implemented to couple the low-band filter (LB), mid-band filter (MB), high-band filter (HB) to the off-FEM signal paths 51, 52 on the phone board 50*b*.

Figure 7:
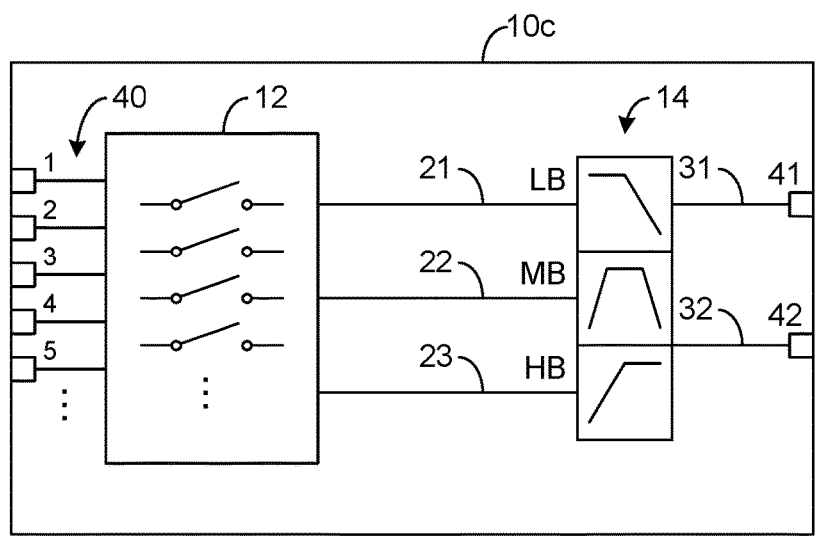
FIG. 7 shows another example FEM product configured to provide two antenna ports and a plurality of signal ports to allow routing of transmit and/or receive signals to and/or from the antenna ports.

In yet another example, FIG. 7 shows a third example FEM product 10*c* configured to provide two antenna ports 41, 42. Such a FEM product is shown to also include a plurality of signal ports 40 configured to facilitate routing of transmit (Tx) and/or receive (Rx) signals to and/or from the antenna ports (41, 42). Some or all of such signal ports can be coupled with an assembly 12 of switches to allow, for example, a carrier aggregation operation involving a plurality of bands, a non-carrier aggregation operation involving a selected band, etc.

In the example of FIG. 7, an assembly 14 of filters is shown to include a low-band filter (LB), a mid-band filter (MB), and a high-band filter (HB). The low-band filter LB is shown to be coupled to the switch assembly 12 through a first signal path 21, and also coupled to the first antenna port 41 through a first signal path 31. The mid-band filter MB is shown to be coupled to the switch assembly 12 through a second signal path 22, and also coupled to the second antenna port 42 through a second signal path 32. The high-band filter HB is shown to be coupled to the switch assembly 12 through a third signal path 23, and also coupled to the second antenna port 42 through the second signal path 32.

Figure 8:
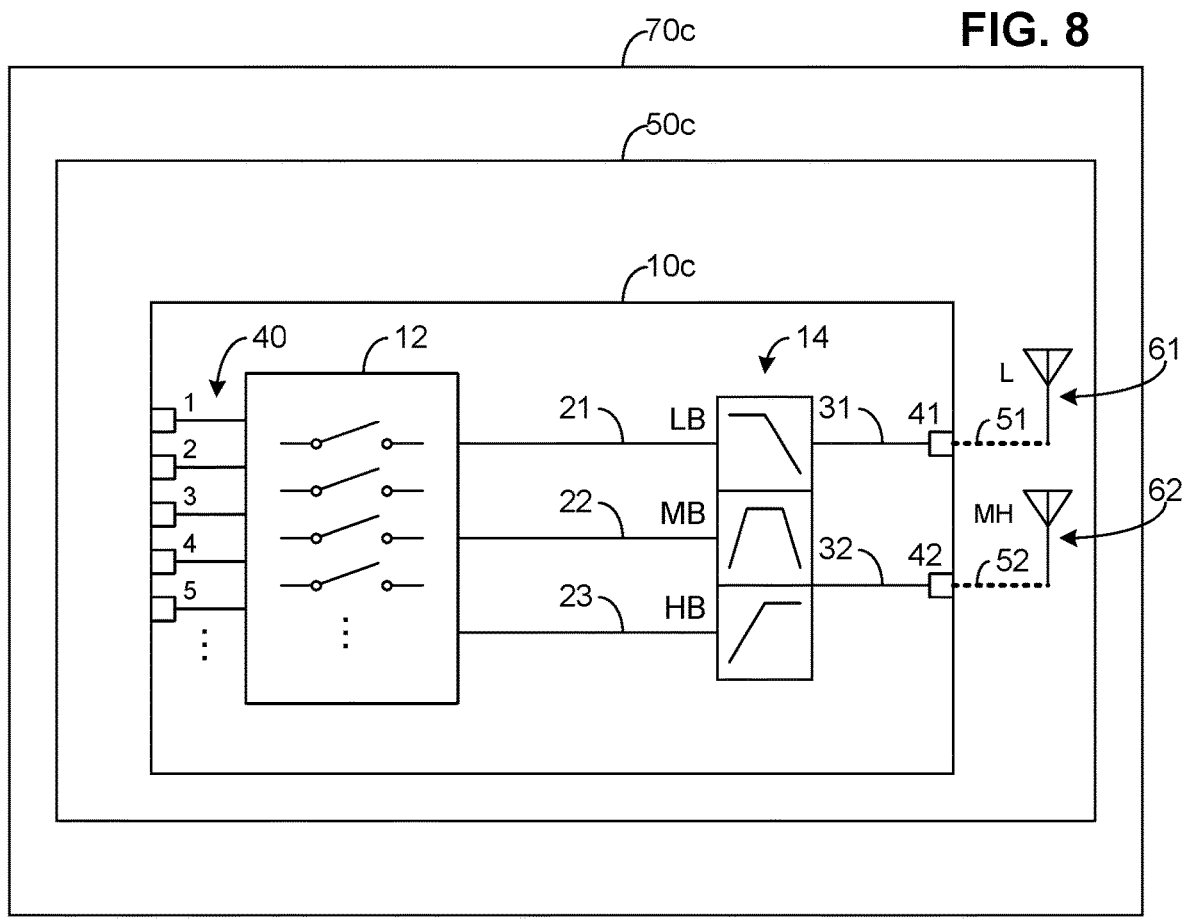
FIG. 8 shows an example of a configuration of a wireless device having the FEM product of FIG. 7.

FIG. 8 shows an example of a third configuration 70*c* of a wireless device (such as a cellular phone) having the third FEM product 10*c* of FIG. 7. For the purpose of description, such a third configuration (70*c*) can be implemented as an alternate configuration of the generally same wireless device of FIG. 4.

In the example of FIG. 8, the wireless device with the third configuration 70*c* is shown to include a third phone board configuration 50*c* that includes a signal routing circuit configured to couple the two antenna ports (41, 42) of the third FEM product 10*c* to two antennas 61, 62. The first antenna 61 can be configured for low band (L) operations, and the second antenna 62 can be configured for mid and high band operations (MH). More particularly, two signal paths 51, 52 are shown to couple the respective antenna ports (41, 42) of the third FEM product 10*c* to the respective antennas 61, 62, to accommodate various operations involving the low-band antenna 61 and/or the mid/high-band antenna 62.

In the example of FIG. 8, each of the two antennas 61, 62 may be implemented on the phone board 50*c*, off of the phone board 50*c* (but within the phone 70*c*), or some combination thereof. It is also noted that in the example of FIG. 8, the signal routing configuration on the third FEM product 10*c* is implemented to accommodate the example signal routing configuration on the phone board 50*c*. More particularly, the signal paths 31, 32 as well as the two antenna ports 41, 42 are implemented to couple the low-band filter (LB), mid-band filter (MB), high-band filter (HB) to the off-FEM signal paths 51, 52 on the phone board 50c.

FIGS. 9-14 show various examples where a single FEM product 100 can be utilized in different configurations of a wireless device such as a cellular phone. For the purpose of description, such different configurations can be similar to the three examples described herein in reference to FIGS. 4, 6 and 8. However, it will be understood that a single FEM product having one or more features as described herein can be implemented in other configurations of a wireless device.

Figure 9:
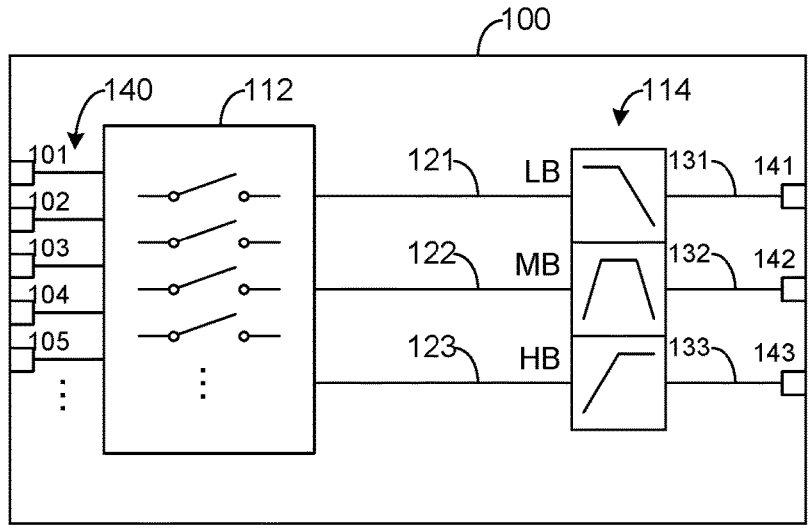
FIG. 9 shows an example of a single FEM product configured to provide three antenna ports and a plurality of signal ports to allow routing of transmit and/or receive signals to and/or from the antenna ports.

FIG. 9 shows an example of a single FEM product 100 configured to provide three antenna ports 141, 142, 143. Such a single FEM product is shown to also include a plurality of signal ports 140 configured to facilitate routing of transmit (Tx) and/or receive (Rx) signals to and/or from the antenna ports (141, 142, 143). Some or all of such signal ports can be coupled with an assembly 112 of switches to allow, for example, a carrier aggregation operation involving a plurality of bands, a non-carrier aggregation operation involving a selected band, etc.

In the example of FIG. 9, an assembly 114 of filters is shown to include a low-band filter (LB), a mid-band filter (MB), and a high-band filter (HB). The low-band filter LB is shown to be coupled to the switch assembly 112 through a first signal path 121, and also coupled to the first antenna port 141 through a first signal path 131. The mid-band filter MB is shown to be coupled to the switch assembly 112 through a second signal path 122, and also coupled to the second antenna port 142 through a second signal path 132. The high-band filter HB is shown to be coupled to the switch assembly 112 through a third signal path 123, and also coupled to the third antenna port 143 through a third signal path 133.

Figure 10:
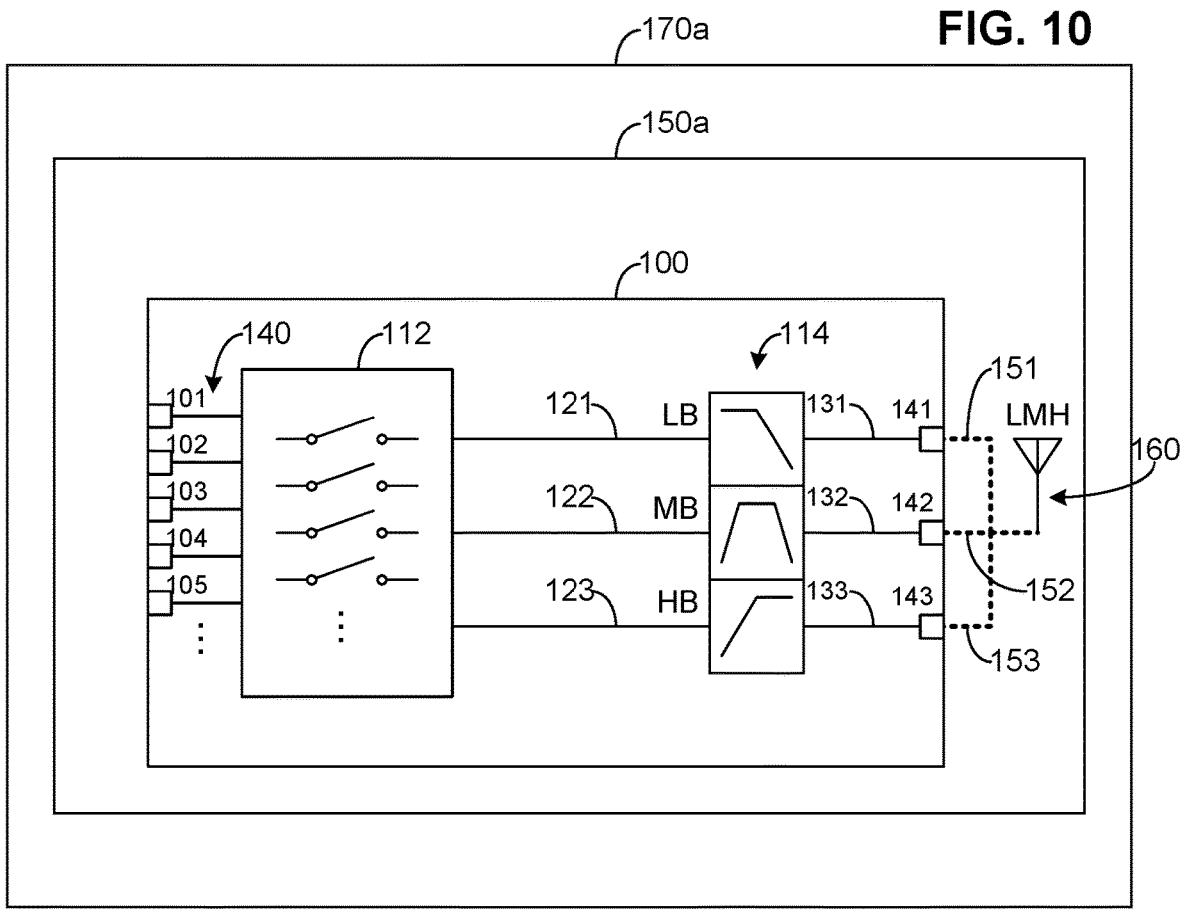
FIG. 10 shows an example of a configuration of a wireless device having the FEM product of FIG. 9.

FIG. 10 shows an example of a first configuration 170a of a wireless device (such as a cellular phone) having the single FEM product 100 of FIG. 9. The wireless device with the first configuration 170a is shown to include a first phone board configuration 150a that includes a signal routing circuit configured to couple the three antenna ports (141, 142, 143) of the single FEM product 100 to a single antenna 160 (e.g., an antenna capable of low, mid and high band (LMH) operations). More particularly, three signal paths 151, 152, 153 are shown to couple the respective antenna ports (141, 142, 143) of the single FEM product 100 to the single antenna 160, to accommodate various operations involving the low-band, mid-band, and/or high-band with the single antenna 160.

In the example of FIG. 10, the antenna 160 may be implemented on the phone board 150a, off of the phone board 150a (but within the phone 170a), or some combination thereof. It is also noted that in the example of FIG. 10, the example signal routing configuration on the phone board 150a can be implemented to accommodate the example signal routing configuration on the single FEM product 100. More particularly, the off-FEM signal paths 151, 152, 153 on the phone board 150a can be implemented to couple the three antenna ports 141, 142, 143 associated with the low-band filter (LB), mid-band filter (MB), high-band filter (HB) to the single LMH antenna 160.

It is noted that while the example FEM product 100 of FIG. 9 is similar to the example first FEM product 10a of FIGS. 3 and 4 at the simplified diagram level, one or more features associated with the LB, MB and/or HB filter paths are different. For example, the example first FEM product 10a of FIGS. 3 and 4 is typically implemented specifically to accommodate all three of the LB, MB, HB operations with the single LMH antenna (60 in FIG. 4). Accordingly, such LB, MB and/or HB filter paths of FIGS. 3 and 4 are generally not the same as the LB, MB and/or HB filter paths of FIGS. 5 and 6 or the LB, MB and/or HB filter paths of FIGS. 7 and 8.

For example, since the first FEM product 10a of FIGS. 3 and 4 is implemented specifically for the LB, MB, HB operations with the single LMH antenna, the three filters (LB, MB, HB) are configured accordingly to provide desirable performance levels in, for example, insertion loss, out-of-band rejection, and impedance (e.g., in-band and out-of-band frequency ranges).

In the example of FIGS. 5 and 6, however, the first antenna port 41 of the second FEM product 10b is coupled to both of the LB and MB filters to accommodate the LB, MB operations with the LM antenna 61. Further, the second antenna port 42 of the second FEM product 10b is coupled to the HB filter to accommodate the HB operations with the H antenna 62. Thus, while the filter path associated with the HB filter in the second FEM product 10b (FIGS. 5 and 6) may be similar to the filter path associated with the HB filter in the first FEM product 10a (FIGS. 3 and 4), the filter paths associated with the LB and MB filters in the second FEM product 10b (FIGS. 5 and 6) are generally different than the filter paths associated with the LB and MB filters in the first FEM product 10a (FIGS. 3 and 4). Accordingly, the first FEM product 10a and the second FEM product 10b have different components.

Similarly, in the example of FIGS. 7 and 8, the first antenna port 41 of the third FEM product 10c is coupled to the LB filter to accommodate the LB operations with the L antenna 61. The second antenna port 42 of the third FEM product 10c is coupled to both of the MB and HB filters to accommodate the MB, HB operations with the MH antenna 62. Thus, while the filter path associated with the LB filter in the third FEM product 10c (FIGS. 7 and 8) may be similar to the filter path associated with the LB filter in the first FEM product 10a (FIGS. 3 and 4), the filter paths associated with the MB and HB filters in the third FEM product 10c (FIGS. 7 and 8) are generally different than the filter paths associated with the MB and HB filters in the first FEM product 10a (FIGS. 3 and 4). Accordingly, the first FEM product 10a and the third FEM product 10c have different components. Similarly, the second FEM product 10b and the third FEM product 10c have different components.

In some embodiments, the same single FEM product 100 of FIG. 9 can be advantageously utilized for phone board configurations other than the example of FIG. 10. For example, FIG. 12 shows that the single FEM product 100 of FIG. 9 can be implemented for an antenna configuration that is similar to the example of FIG. 6 where the LB and MB filters are operated with an LM antenna (61 in FIG. 6, and 161 in FIG. 12). It is noted that the FEM product 100 shown in FIG. 11 is substantially the same as the FEM product 100 of FIG. 9, and is shown next to FIG. 12 for convenience.

Figure 11:
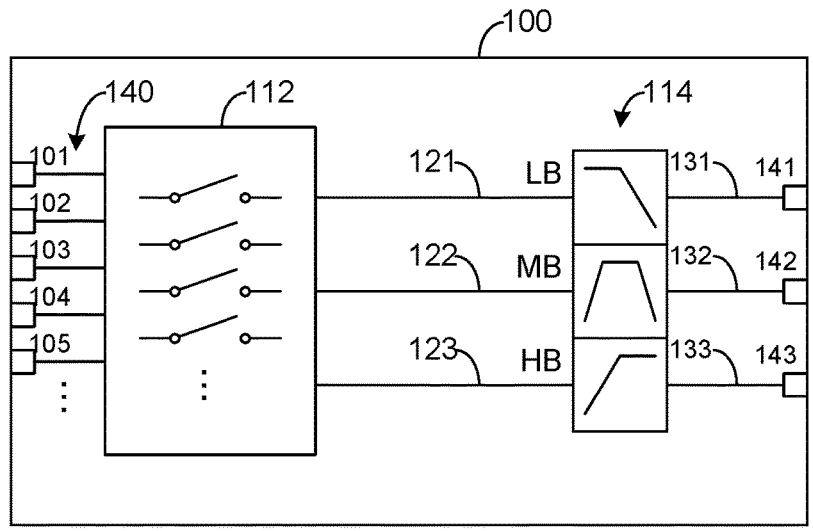
FIG. 11 shows an example single FEM product that is generally the same as the example of FIG. 9.
Figure 12:
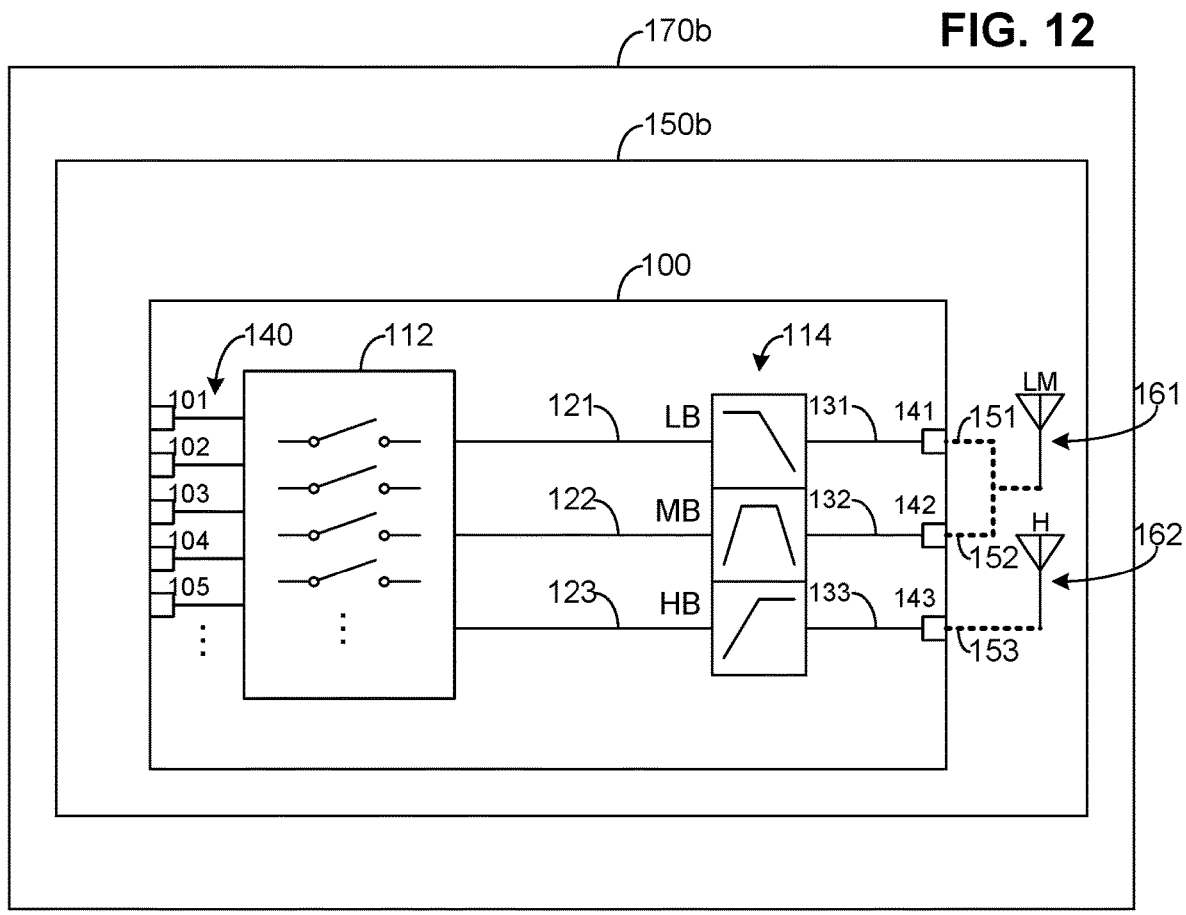
FIG. 12 shows an example of a configuration of a wireless device having the FEM product of FIG. 11.

FIG. 12 shows an example of a second configuration 170b of a wireless device (such as a cellular phone) having the single FEM product 100 of FIGS. 9 and 11. For the purpose of description, such a second configuration (170b) can be implemented as an alternate configuration of the generally same wireless device of FIG. 10.

In the example of FIG. 12, the wireless device with the second configuration 170b is shown to include a second phone board configuration 150b that includes a signal routing circuit configured to couple the three antenna ports (141, 142, 143) of the FEM product 100 to two antennas 161, 162.

The first antenna 161 can be configured for low and mid band (LM) operations, and the second antenna 162 can be configured for high band operations (H). More particularly, two signal paths 151, 152 are shown to couple the respective antenna ports (141, 142) of the FEM product 100 to the first antenna 161, to accommodate various operations involving the low/mid-band antenna 161. A signal path 153 is shown to couple the antenna port 143 of the FEM product 100 to the second antenna 162, to accommodate various operations involving the high-band antenna 162.

In the example of FIG. 12, each of the two antennas 161, 162 may be implemented on the phone board 150b, off of the phone board 150b (but within the phone 170b), or some combination thereof. It is also noted that in the example of FIG. 12, the example signal routing configuration on the phone board 150b is implemented to accommodate the signal routing configuration on the FEM product 100. More particularly, the off-FEM signal paths 151, 152, 153 on the phone board 150b are implemented to couple the three antenna ports 141, 142, 143 corresponding to the low-band filter (LB), mid-band filter (MB), high-band filter (HB) to the two antennas 161, 162.

Figure 13:
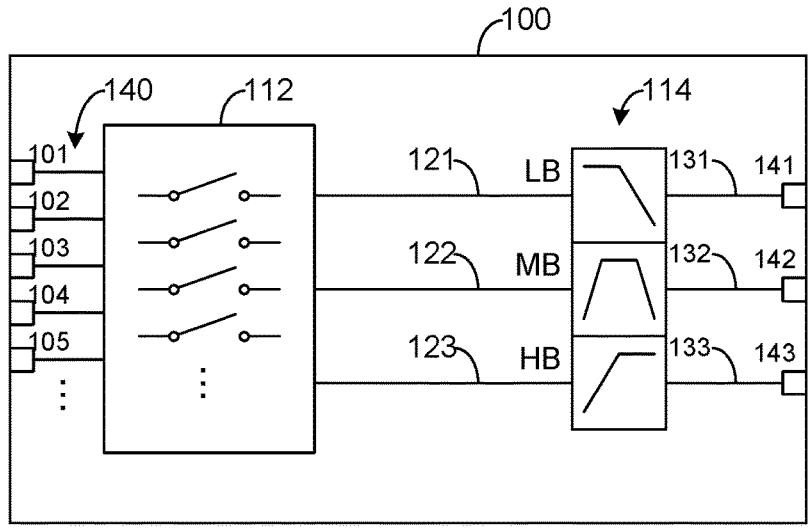
FIG. 13 shows an example single FEM product that is generally the same as the example of FIG. 9.
Figure 14:
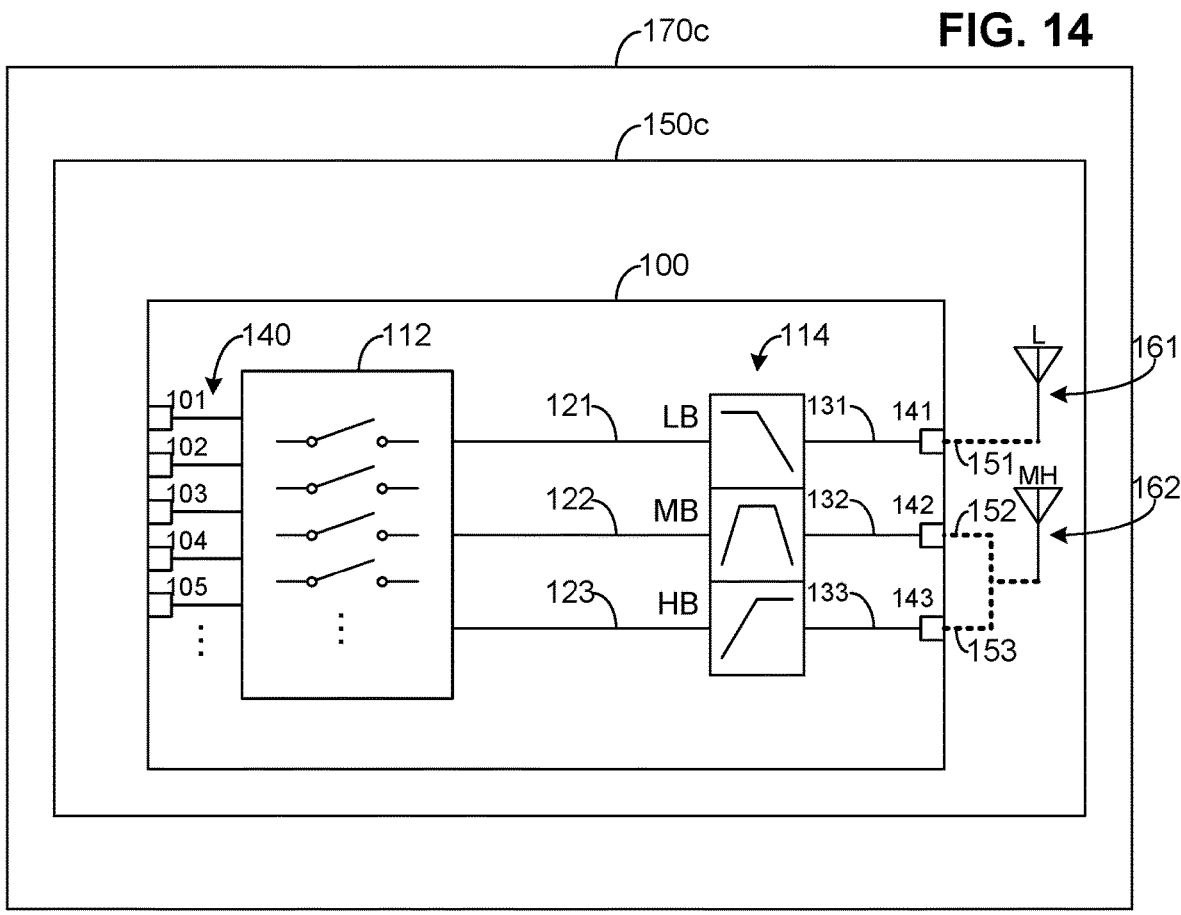
FIG. 14 shows an example of a configuration of a wireless device having the FEM product of FIG. 13.

In another example, FIG. 14 shows that the single FEM product 100 of FIG. 9 can be implemented for an antenna configuration that is similar to the example of FIG. 8 where the MB and HB filters are operated with an MH antenna (62 in FIG. 8, and 162 in FIG. 14). It is noted that the FEM product 100 shown in FIG. 13 is substantially the same as the FEM product 100 of FIG. 9, and is shown next to FIG. 14 for convenience.

FIG. 14 shows an example of a third configuration 170c of a wireless device (such as a cellular phone) having the single FEM product 100 of FIGS. 9 and 13. For the purpose of description, such a third configuration (170c) can be implemented as an alternate configuration of the generally same wireless device of FIG. 10.

In the example of FIG. 14, the wireless device with the third configuration 170c is shown to include a third phone board configuration 150c that includes a signal routing circuit configured to couple the three antenna ports (141, 142, 143) of the FEM product 100 to two antennas 161, 162. The first antenna 161 can be configured for low band operations (L), and the second antenna 162 can be configured for mid and high band (MH) operations. More particularly, two signal paths 152, 153 are shown to couple the respective antenna ports (142, 143) of the FEM product 100 to the second antenna 162, to accommodate various operations involving the mid/high-band antenna 162. A signal path 151 is shown to couple the antenna port 141 of the FEM product 100 to the first antenna 161, to accommodate various operations involving the low-band antenna 161.

In the example of FIG. 14, each of the two antennas 161, 162 may be implemented on the phone board 150c, off of the phone board 150c (but within the phone 170c), or some combination thereof. It is also noted that in the example of FIG. 14, the example signal routing configuration on the phone board 150c is implemented to accommodate the signal routing configuration on the FEM product 100. More particularly, the off-FEM signal paths 151, 152, 153 on the phone board 150c are implemented to couple the three antenna ports 141, 142, 143 corresponding to the low-band filter (LB), mid-band filter (MB), high-band filter (HB) to the two antennas 161, 162.

As described herein in reference to FIGS. 9-14, the same FEM product 100 can be utilized in various configurations of antenna(s) and band combination(s) in wireless devices. As described herein, such utilization of the same FEM product 100 in different wireless device configurations can be facilitated by appropriate signal routing variations implemented on the corresponding phone boards.

In some embodiments, the FEM product 100 of FIGS. 9-14 can be configured such that a filter path for each band is designed to have a desirable functionality for non-carrier aggregation operation, including, for example, low insertion loss in the pass band and good rejection in the stop band to provide co-existence with one or more other communications standards (e.g., GPS, WLAN, etc.). The filter paths can also be designed to have appropriate impedances in their corresponding stop band such that they can be combined outside of the FEM 100 to form any desired combinations of diplexer or triplexer for carrier aggregation operations without sacrificing radio-frequency (RF) performance. For example, to support LB and MB carrier aggregation with a two-antenna configuration wireless device, a phone manufacturer can short the LB pin and MB pin of the FEM 100 on the phone board, and then connect the combined pin to the LM antenna (e.g., 161 in FIG. 12). In another example, to support MB and HB carrier aggregation with a two-antenna configuration wireless device, a phone manufacturer can short the MB pin and HB pin of the FEM 100 on the phone board, and then connect the combined pin to the MH antenna (e.g., 162 in FIG. 14).

In some embodiments, the FEM product 100 of FIGS. 9-14 can further include one or more components and/or circuits along or associated with some or all of the filter paths. Such components and/or circuits can include, for example, a phase-shifting circuit and/or an impedance matching circuit configured to facilitate use of the FEM product 100 in various antenna configurations with desirable performance levels in non-carrier aggregation and carrier aggregation operations.

In some embodiments, a FEM having one or more features as described herein can be implemented as a packaged module. Such a packaged module can include a packaging substrate (e.g., laminate substrate, ceramic substrate, etc.) configured to receive a plurality of components. The packaged module can further include one or more semiconductor die having integrated circuit(s). For example, the switch assembly 112 of FIGS. 9-14 can be implemented on a semiconductor die such as a silicon-on-insulator (SOI) die. The packaged module can further include one or more passive devices such as SMT components, filter devices, etc. Such passive devices can form or facilitate various functionalities of the FEM 100, such as filtering functionalities.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 15:
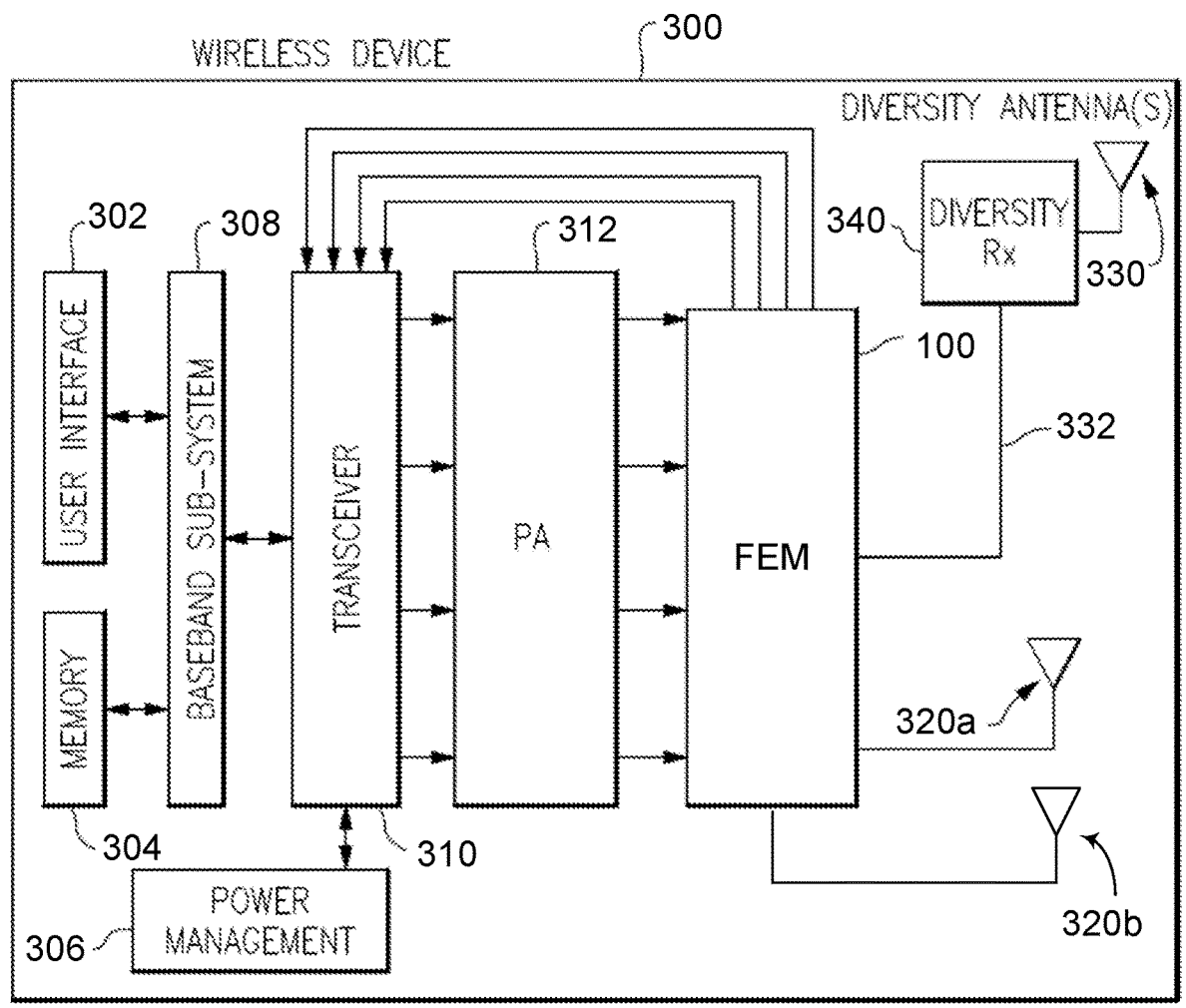
FIG. 15 shows an example of a wireless device having one or more features as described herein.

FIG. 15 depicts an example wireless device 300 having one or more advantageous features described herein. In some embodiments, a front-end module 100 having one or more features as described herein can be implemented in such a wireless device.

In the example of FIG. 15, power amplifiers (PAs) in a PA module 312 can receive their respective RF signals from a transceiver 310 that can be configured and operated to generate RF signals to be amplified and transmitted, and to process received signals. The transceiver 310 is shown to interact with a baseband sub-system 308 that is configured to provide conversion between data and/or voice signals suitable for a user and RF signals suitable for the transceiver 310. The transceiver 310 is also shown to be connected to a power management component 306 that is configured to manage power for the operation of the wireless device 300. Such power management can also control operations of the baseband sub-system 308 and other components of the wireless device 300.

The baseband sub-system 308 is shown to be connected to a user interface 302 to facilitate various input and output of voice and/or data provided to and received from the user. The baseband sub-system 308 can also be connected to a memory 304 that is configured to store data and/or instructions to facilitate the operation of the wireless device, and/or to provide storage of information for the user.

In the example of FIG. 15, a diversity receive (DRx) module 340 can be implemented between one or more diversity antennas (e.g., diversity antenna 330) and the front-end module 100. Such a configuration can allow an RF signal received through the diversity antenna 330 to be processed (in some embodiments, including amplification by an LNA) with little or no loss of and/or little or no addition of noise to the RF signal from the diversity antenna 330. Such processed signal from the DRx module 340 can then be routed to the front-end module 100 through one or more signal paths.

In the example of FIG. 5, a plurality of antennas (e.g., 320a, 320b) can be configured to, for example, facilitate transmission of RF signals from the PA module 312. In some embodiments, receive operations can also be achieved through some or all of the antennas 320a, 320b.

For the purpose of description, it will be understood that low band (LB), mid band (MB), and high band (HB) can include frequency bands associated with such bands. Such frequency bands can include cellular frequency bands such as the examples listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
| --- | --- | --- | --- |
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |

TABLE 1-continued

| Band | Mode | Tx Frequency Range (MHz) | Rx Frequency Range (MHz) |
| --- | --- | --- | --- |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front-end module device comprising:
a plurality of signal ports;
antenna ports including a low-band antenna port, a mid-band antenna port and a high-band antenna port;
an assembly of filters implemented between the signal ports and the antenna ports, and including a low-band filter coupled to the low-band antenna port, a mid-band filter coupled to the mid-band antenna port and a high-band filter coupled to the high-band antenna port; and
a switch assembly implemented between the signal ports and the assembly of filters, the switch assembly including a filter node that is coupled to each of the low-band, mid-band and high-band antenna ports through the respective filter, each filter configured to support non-carrier aggregation operation in a respective frequency band and to support diplexer or triplexer carrier aggregation operation with the other one or two filters, such that coupling configuration of the antenna ports to one or more antennas is achieved outside of the front-end module device.

2. The front-end module device of claim 1 wherein the low-band filter, the mid-band filter, and the high-band filter are configured to support an antenna configuration having a single antenna, to enable the triplexer carrier aggregation operation.

3. The front-end module device of claim 1 wherein the low-band filter, the mid-band filter, and the high-band filter are configured to support an antenna configuration having two antennas, to enable the diplexer carrier aggregation operation involving low and mid bands or mid and high bands.

4. The front-end module device of claim 3 wherein the low-band filter and the mid-band filter are configured to support the first of the two antennas, and the high-band filter is configured to support the second of the two antennas.

5. The front-end module device of claim 3 wherein the low-band filter is configured to support the first of the two antennas, and the mid-band filter and the high-band filter are configured to support the second of the two antennas.

6. The front-end module device of claim 1 wherein the low-band filter, the mid-band filter and the high-band filter are configured to provide desirable filtering performance levels including performance levels associated with non-carrier aggregation operations.

7. The front-end module device of claim 1 wherein the low-band filter, the mid-band filter and the high-band filter are configured to provide desirable filtering performance levels including performance levels associated with carrier aggregation operations.

8. The front-end module device of claim 1 wherein the low-band filter, the mid-band filter and the high-band filter are configured to provide desirable filtering performance levels including one or more performance levels associated with insertion loss, out-of-band rejection, and impedance.

9. A packaged module comprising:
a packaging substrate configured to receive a plurality of components; and
a front-end circuit implemented on the packaging substrate and including a plurality of signal ports, and antenna ports including a low-band antenna port, a mid-band antenna port and a high-band antenna port, the front-end circuit further including an assembly of filters implemented between the signal ports and the antenna ports, and including a low-band filter coupled to the low-band antenna port, a mid-band filter coupled to the mid-band antenna port and a high-band filter coupled to the high-band antenna port, the front-end circuit further including a switch assembly implemented between the signal ports and the assembly of filters, the switch assembly including a filter node that is coupled to each of the low-band, mid-band and high-band antenna ports through the respective filter, each filter configured to support non-carrier aggregation operation in a respective frequency band and to support diplexer or triplexer carrier aggregation operation with the other one or two filters, such that coupling configuration of the antenna ports to one or more antennas is achieved outside of the packaged module.

10. The packaged module of claim 9 wherein the packaged module is a front-end module.

11. A wireless device comprising:
a transceiver configured to process signals;
one or more antennas; and
a front-end module implemented between the transceiver and the one or more antennas, the front-end module including a plurality of signal ports, and antenna ports including a low-band antenna port, a mid-band antenna port and a high-band antenna port, the front-end module further including an assembly of filters implemented between the signal ports and the antenna ports, and including a low-band filter coupled to the low-band antenna port, a mid-band filter coupled to the mid-band antenna port and a high-band filter coupled to the high-band antenna port, the front-end module further including a switch assembly implemented between the signal ports and the assembly of filters, the switch assembly including a filter node that is coupled to each of the low-band, mid-band and high-band antenna ports through the respective filter, each filter configured to support non-carrier aggregation operation in a respective frequency band and to support diplexer or triplexer carrier aggregation operation with the other one or two filters, such that coupling configuration of the antenna ports to the one or more antennas is achieved outside of the front-end module.

12. The wireless device of claim 11 wherein the low-band filter, the mid-band filter, and the high-band filter are configured to support an antenna configuration having a single antenna of the one or more antennas, with corresponding desirable filtering performance levels.

13. The wireless device of claim 11 wherein the low-band filter, the mid-band filter, and the high-band filter are configured to support an antenna configuration having two antennas of the one or more antennas, with corresponding desirable filtering performance levels.

14. The wireless device of claim 13 wherein the low-band filter and the mid-band filter are configured to support the first of the two antennas, and the high-band filter is configured to support the second of the two antennas.

15. The wireless device of claim 13 wherein the low-band filter is configured to support the first of the two antennas, and the mid-band filter and the high-band filter are configured to support the second of the two antennas.

16. The wireless device of claim 11 wherein the wireless device is a cellular phone configured for operation in a selected one of a plurality of different regions, such that the front-end module is capable of supporting operations of the wireless device in at least some of the different regions with the different antenna configurations.

* * * * *